H. C. SCHARNWEBER & E. BARKHAM.

Corn-Sheller.

No. 8,561. Reissued Jan. 28, 1879.

Attest:
A. Barthel
Chas J. Heard

Inventor.
H. C. Scharnweber
E. Barkham
By Atty
Chas S. Spragie

N. PETERS, PHOTO-LITHOGRAPHER, WASHINGTON, D. C.

UNITED STATES PATENT OFFICE.

HENRY C. SCHARNWEBER AND EDMUND BARKHAM, OF COMMERCE, MICH

IMPROVEMENT IN CORN-SHELLERS.

Specification forming part of Letters Patent No. 201,359, dated March 19, 1878; Reissue No. 8,561, dated January 28, 1879; application filed October 9, 1878.

*To all whom it may concern:*

Be it known that we, HENRY C. SCHARNWEBER and EDMUND BARKHAM, of Commerce, in the county of Oakland and State of Michigan, have invented a new and useful Improvement in Corn-Shellers, of which the following is a specification:

The nature of this invention relates to new and useful improvements in the construction of corn-shelling machines; and the invention consists in the combination of the shelling-cage with a cylinder rotating within it provided with adjustable teeth; also, in the peculiar manner of vibrating the slotted cob-discharge apron; also, in the combination, with the same, of the carrier-trough and spiral conveyer, as more fully hereinafter explained.

Figure 1:
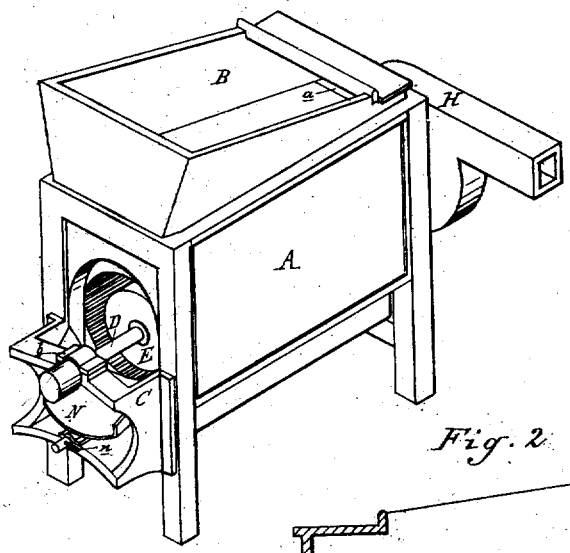
Figure 3:
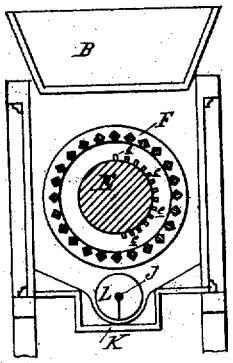
Figure 2:
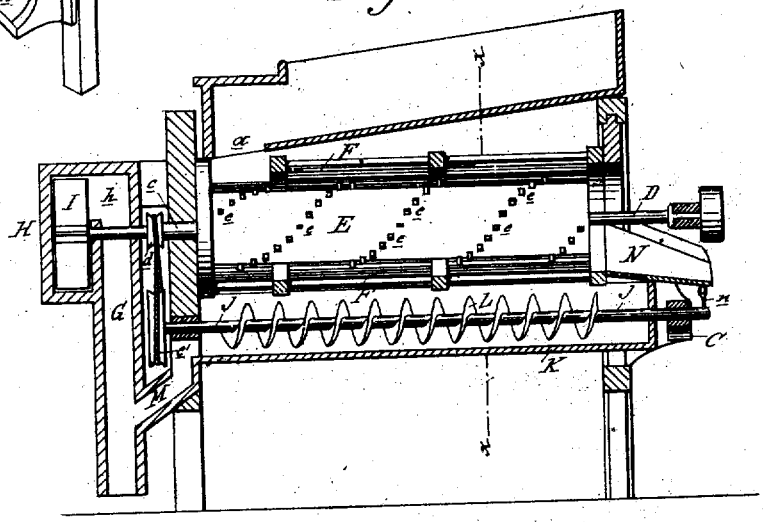
Figure 4:
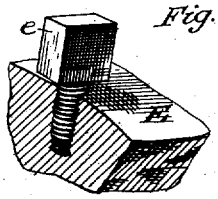

Figure 1 is a perspective view. Fig. 2 is a central longitudinal section. Fig. 3 is a vertical cross-section on the line *x x* in Fig. 2; and Fig. 4, a view showing in detail one of the adjustable teeth and a portion of the cylinder into which the tooth is set.

In the accompanying drawings, which form a part of this specification, A represents the frame and case of a sheller surmounted by the hopper B, whose discharge-orifice *a* is at one end.

Rigidly secured to one end of the frame A is a bracket-frame, C, in the upper girder of which one end of the shaft D is journaled at *b*, while the other end of the shaft, which runs longitudinally through the center of the case, is journaled in the frame at *c*. Mounted upon this shaft D, so that it will rotate with the same within the case A, is a cylinder, E, in whose surface are spirally arranged the shelling-teeth *e*. These teeth, the projecting heads of which we prefer to make rectangular, are provided with screw-points, by means of which they are secured to said cylinder, and by which they may be regulated in their projection therefrom as circumstances may require. It is essential for the perfect operation of the machine that the projecting parts of the teeth be uniform in length, and the method of securing them to the cylinder renders it easy to secure such uniformity. Again, such adjustability of the teeth is desired in order to render the machine effective in different parts of the country where different sizes of ears and qualities of corn are raised—that is to say, in the northern country the ears of corn are smaller, as a rule, than in the more southern States; hence the desirability of the adjustability of the teeth to adapt the machine to do its work successfully without the necessity of building different-sized shelling-cages, within which the cylinder revolves. Surrounding this cylinder, except at the point directly under the discharge-orifice of the hopper, is a shelling-cage, F, which is composed of rectangular bars of iron set so as to present one corner or edge of each bar to the ears of corn as they are thrown against them by the action of the cylinder, and at such distance apart as to prevent anything larger than a grain of corn passing between them, thereby allowing the shelled corn to pass to the conveyer, while the cob is discharged at the tail of the cylinder, and preventing the necessity of subsequently screening the shelled corn to separate it from the cobs.

Rigidly secured to one end of the frame A is a wind-trunk, G, carrying at its top a fan-case and an exhaust-trunk, H, an air-passage, *h*, communicating between the trunk G and fan-case H. The shaft D extends beyond the case A, and through the fan-case and wind-trunk, carrying upon its end a fan-wheel, I.

Between the wind-trunk G and the case A there is keyed to the shaft D a pulley, *d*. Directly under this pulley *d* is another pulley, *e'*, mounted on the end of a carrier-shaft, J, journaled through the frame A, and within a carrier-trough, K, constructed below the main case of the machine. Secured to this shaft J is a spiral carrier, L.

From the discharge end of the carrier-trough there is a spout, M, which connects with the lower end of the wind-trunk.

There is an opening in the end of the case A, opposite the end of the shelling-cage, through which the cob is ejected. Should there be any kernels of corn still adhering to the cob they will be shaken off by the slotted vibrating apron N, which is pivoted at that end of the machine to the case, and receives its vibrating or jarring motion from a stud or knocker, *n*, upon the end of the carrier-shaft. The corn which is shaken off by this apron falls through the slots or openings down into the carrier-trough.

A pulley is secured to one end of the shaft D, by means of which motion is imparted to the various parts from any convenient power. In a machine thus constructed the shelled corn is discharged direct from the cylinder to the conveyer without the intervention of a screen, as the cobs are prevented from mingling with the shelled corn by the peculiar construction of the shelling-cage.

Corn in the ear is fed into the hopper B, and discharged therefrom through the orifice into the shelling-cage and upon the spiked cylinder. This cylinder, being kept continually revolving, throws the ears against the bars of the cage, the result of which is to effectually shell the corn from the ear. The kernels of corn drop to the bottom of the case and into the carrier-trough, from whence they are carried to the spout M and discharged into the wind-trunk G, falling from thence into a bag or other proper receptacle. Should there be any chaff or small pieces of cob mixed with the corn after being shelled, they are drawn up the wind-trunk by the fan or blower, and discharged through its discharge-trunk. The cob passes on over the cylinder to the exit at the rear of the machine, and falls upon the vibrating apron, which shakes off what kernels of corn there may be still sticking to it, such kernels falling through the slots in the apron into the conveyer-trough, while the cob falls off upon the floor.

What we claim as our invention, and desire to secure by Letters Patent, is—

1. In a corn-shelling machine, and in combination with a stationary cage, constructed as described, a rotating cylinder provided with spirally-arranged teeth, adjustably secured thereto, substantially as and for the purposes specified.

2. In a corn-shelling machine, the slotted discharge-apron N, vibrated by a knocker, *n*, upon the end of the conveyer-shaft, situated below it, substantially as described and shown, and in combination with the cylinder E and shelling-cage F, for the purposes set forth.

3. In a corn-shelling machine, the combination of the carrier-trough K, situated longitudinally below the shelling-cylinder and inclosing cage, and the spiral conveyer L, having its shaft J passing through the end of the carrier-trough, with the slotted cob-discharge apron N, vibrated by the conveyer-shaft, and having its slots arranged directly over the end of the carrier-trough, constructed and arranged substantially as described and shown.

HENRY C. SCHARNWEBER.
EDMUND BARKHAM.

Witnesses:
T. B. KENNEDY,
FRANK BENNETT.